United States Patent [19]

Nebon et al.

[11] Patent Number: 4,686,334

[45] Date of Patent: Aug. 11, 1987

[54] FRAME WITH CLIP-ON DRAW-IN GRIPS FOR A WITHDRAWABLE MULTIPOLE CIRCUIT BREAKER

[75] Inventors: Jean-Pierre Nebon, St. Martin-Le-Vinoux; Alain Gerbert-Gaillard, Tullins, both of France

[73] Assignee: Merlin Gerin, Grenoble, France

[21] Appl. No.: 865,987

[22] Filed: May 22, 1986

[30] Foreign Application Priority Data

Jun. 5, 1985 [FR] France ................... 85 08597

[51] Int. Cl.⁴ .............................................. H01H 9/20
[52] U.S. Cl. ................................. 200/50 AA; 200/255
[58] Field of Search ............... 200/50 AA, 254, 255, 200/256; 361/336, 337

[56] References Cited

U.S. PATENT DOCUMENTS 3,427,419  2/1969  Findley ........................... 200/255
4,486,636  12/1984  Prietzel et al. ................. 200/255

FOREIGN PATENT DOCUMENTS 567124  5/1958  Belgium .
1431889  2/1966  France .

Primary Examiner—A. D. Pellinen
Assistant Examiner—Morris Ginsburg
Attorney, Agent, or Firm—Parkhurst & Oliff

[57] ABSTRACT

The invention relates to a frame for housing a withdrawable circuit breaker. The rear wall of the frame comprises an insulating support, through which fixed connection terminals pass, each comprising an internal part on which a draw-in grip is mounted. The end of the terminal is fitted with a single latching edge cooperating with a notch of conjugated shaped, arranged in the draw-in grip, onto which it clips.

4 Claims, 5 Drawing Figures

FRAME WITH CLIP-ON DRAW-IN GRIPS FOR A WITHDRAWABLE MULTIPOLE CIRCUIT BREAKER

BACKGROUND OF THE INVENTION

The invention relates to a withdrawable multipole circuit breaker which is able to be moved in translation between two end of draw-in and extraction travel positions, inside a frame shaped as a parallelipipedic housing, comprising an opening in the front panel enabling the circuit breaker to be extracted and a rear wall opposite the circuit breaker passage opening, said wall being equipped with an insulating support through which fixed connection terminals pass, each comprising a first part external to the housing for electrical connection, notably to an external busbar, and a second part internal to the housing on which is mounted a draw-in grip securedly fixed to the frame, said grip cooperating in the drawn-in position with a corresponding contact terminal of a pole of the circuit breaker.

According to a known withdrawable circuit breaker, each draw-in grip is fixed directly by assembly means to the rear wall of a low voltage cubicle frame. A three-phase circuit breaker requires six draw-in grips to be fitted on the frame. The manufacturing cost of such frames is relatively high, and inspecting the grips when maintenance operations are carried out is complicated, as the rear wall of the frame has to be partially dismantled.

It has also been proposed to fit the draw-in grips on the circuit breaker contact terminals by means of a double clip-on system ensuring bilateral gripping on both the opposite sides of the contact terminal. A device of this kind is described in U.S. Pat. No. 3,427,419. Fitting and removing this type of grips nevertheless still remain difficult.

The object of the invention is to make draw-in grip fitting and removal operations easy, and to use a standard frame designed to be individualized in the final phase of the assembly operation by a judicious choice of the draw-in grips and connection terminals in terms of the circuit breaker rating, the type of terminal connection and the electrodynamic withstand of the grips.

SUMMARY OF THE INVENTION

The frame according to the invention is characterized by the fact that the end of the second internal part of each fixed connection terminal comprises a single latching edge operating in conjunction with a notch of conjugated shape, arranged in the draw-in grip, onto which it clips. The grip is removed by tilting the latter, causing said edge to be automatically unclipped from the notch.

It can be noted that clipping and unclipping the grip can be carried out quickly without tools, thus making assembly and inspection operations easy.

According to one embodiment of the invention, the latching edge extends transversely along a large face at the end of the connection terminal, the smooth opposite parallel face being shaped as a sliding surface for the contact fingers of the grip, in such a way that the tilting point of the grip when disassembly takes place coincides appreciably with the position of the latching edge.

The structure of the draw-in grip is advantageously symmetrical so as to enable it to be fitted onto the connection terminal quickly, whichever way the grip is facing.

BRIEF DESCRIPTION OF THE DRAWINGS

Other advantages and characteristics will become more clearly apparent from the following description of different embodiments of the invention, given as examples only and represented by the accompanying drawings, in which.

DESCRIPTION OF THE PREFERRED EMBODIMENT

Figure 1:
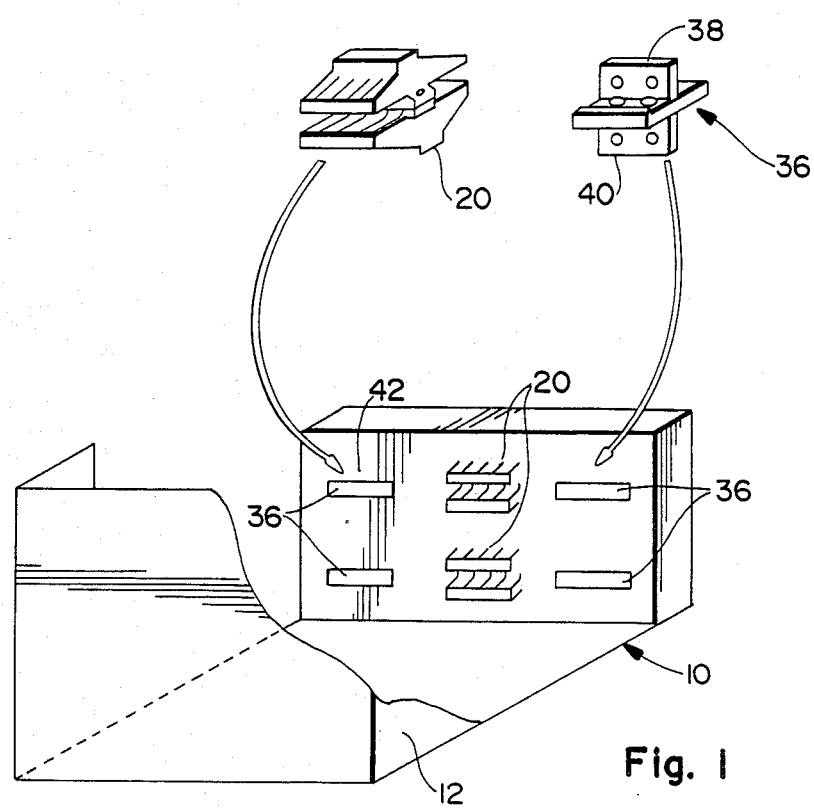
FIG. 1 is a partially cutaway perspective view, showing the rear wall of a frame according to the invention.

In the figures, a fixed frame is shaped as a parallelipipedic housing 12, acting as a support for a withdrawable type multipole circuit breaker 14, notably with an insulated moulded casing 16. Each pole of the circuit breaker 14 comprises a pair of contact terminals 18, protruding from the rear face of the casing 16 and cooperating in the drawn-in position of the circuit breaker with a pair of superposed draw-in grips 20, securedly united to the frame 10 in an indirect manner described herein in detail. The low voltage, high rating circuit breaker 14 can be moved in translation in both directions (arrow F) between two end of draw-in and extraction travel positions, by actuation of an auxiliary operating mechanism (not shown) disposed in proximity to the front panel of the housing 12.

Each draw-in grip 20 comprises a plurality of pairs of opposing elementary contact fingers 22, 24, operating in conjunction with compression springs 26, disposed on either side of the fingers, the assembly being arranged inside a connection cage 28. Each elementary contact finger 22, 24 is shaped as a bridge made of conducting material, notably copper, extending according to the longitudinal draw-in direction (arrow F) and comprising two end contacts 22a, 22b; 24a, 24b and an external center face 30 disposed between the end contacts to act as a bearing surface for the corresponding spring 26.

The opposing contact fingers 22, 24 of each pair are elastically urged towards one another by the compression action of the springs 26 in the central area, leaving at each end of the grip 20, a gap 32, 34 (FIG. 2) between the protuberances of the end contacts 22a, 24a; 22b, 24b. The gap 34 allows clip-on fixing of the grip 20 onto a connection terminal 36 permanently fixed by the brackets 38, 40 to an insulating support 42 of the rear wall of the housing 12. The opposing gap 32 is designed for drawing-in of the corresponding contact terminal 18 of the circuit breaker 14, when the latter is inserted in the housing 12. The draw-in grips 20 are thus securedly united to the frame 10 in an indirect matter via the fixed connection terminal 36 and the fastening brackets 38, 40 attached to the insulating support 42 of the frame 10.

Figure 3:
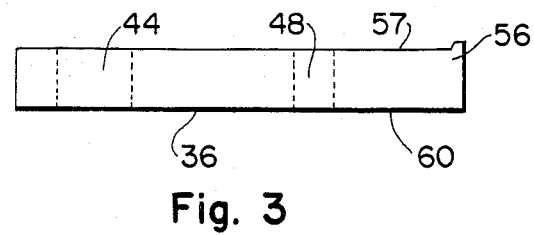
FIG. 3 is an elevation view of the fixed connection terminal according to FIG. 2.
Figure 4:
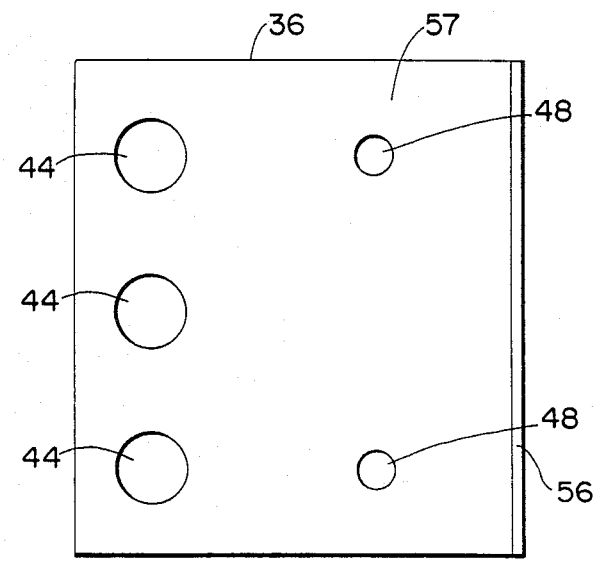
FIG. 4 is a plan view of FIG. 3.

Each rectangular-shaped connection terminal 36 (FIGS. 3 and 4) is provided with orifices 44 enabling connection to an external busbar (not shown) extending to the rear of the housing 12. The connection terminal 36 passes longitudinally through an aperture 46 (FIG. 2)

provided in the insulating support 42, and comprises in addition holes 48 for fixing the angle-brackets 38, 40. In the mounted position of the connection terminal 36, the holes 48 are located appreciably in the vertical plane of the support 42, and the brackets 38, 40 are fixed by means of screws 50 onto the external face 52 of the support 42, opposite the grip 20. The right-hand end 54 (in FIG. 2) of the connection terminal 36 is located inside the housing 12, and is provided with a latching edge 56 extending transversely along the large upper horizontal face 57 of the terminal 36 (see FIG. 3 and 4). The latching edge 56 is single and cooperates, when the grip 20 is clipped on, with a notch 58 or groove of conjugated shape, arranged in each upper contact finger 22 in proximity to the end contact 22b. The lower horizontal face 60 of the terminal 36 is smooth and acts as a sliding surface for the lower contact fingers 24.

Figure 5:
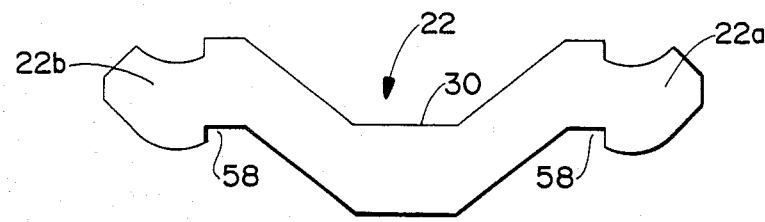
FIG. 5 represents an enlarged scale elevation view of a contact finger of the grip according to FIG. 2.

In FIG. 5, each elementary contact finger 22 of the grip 20 presents a symmetrical profile in relation to the vertical midplane perpendicular to the bearing face 30 of the spring 26. The contact finger 22 is fitted with two symmetrical notches 58, enabling the grip 20 to be clipped onto the terminal 36 by either one of the opposing gaps 32 or 34.

Figure 2:
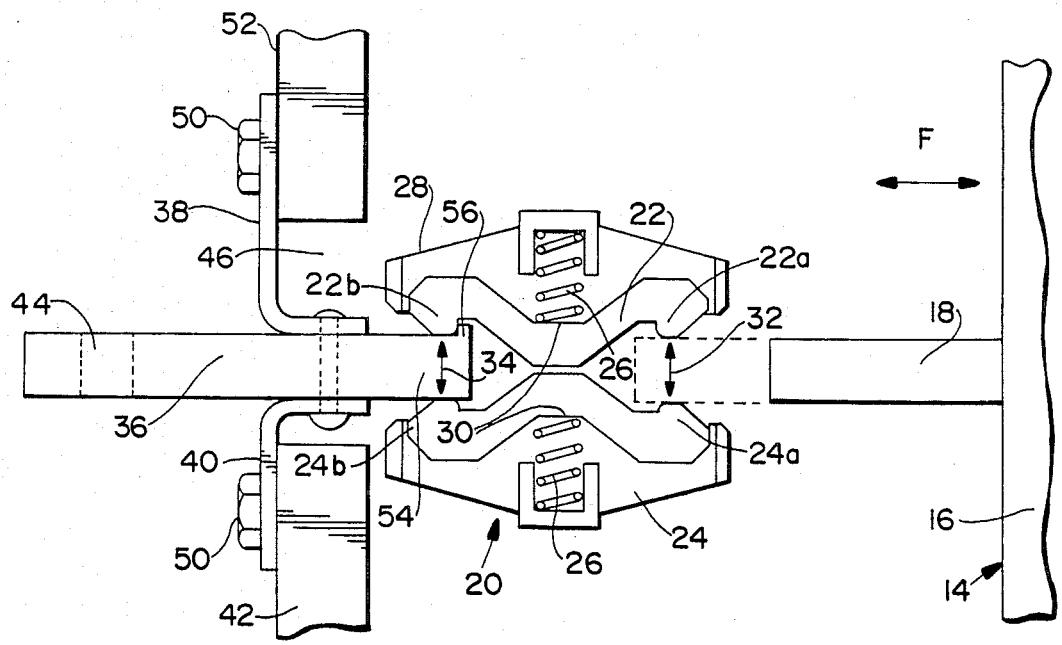
FIG. 2 shows an enlarged scale view of the draw-in grip clipped onto the fixed connection terminal, and the circuit breaker contact terminal being represented in the drawn-in position (dashed lines), and in the drawn-out position (bold lines)

The lower contact fingers 24 of the grip 20 may be devoid of locking notches 58, as represented in FIG. 2, or on the contrary present an identical structure to that of FIG. 5. In the latter case, the grip 20 is totally symmetrical, both in relation to the vertical mid-plane and to the horizontal midplane.

Fitting the draw-in grip 20 onto the connection terminal 36 is performed by clipping the edge 56 into the locking notch 58 of the contact fingers 22. The grip 20 remains in the clipped-on position on the connection terminal 36, when extraction movement of the circuit breaker 14 takes place, during which the contact terminal 18 is freed from the draw-in grip 20 by translational pull to the right, the withdrawn position being represented by the bold lines in FIG. 2. The latching edge 56 constitutes a unidirectional stop in the extraction direction, so as to retain the grip 20 positively on the connection terminal 36, despite the gripping effect exerted by the contact fingers 22, 24 on the opposing faces of the withdrawable contact terminal 18.

The draw-in grip 20 can be easily disassembled without tools by a slight tilting of the cage 28, causing the latching edge 56 and the corresponding notch 58 to be unclipped. The tilting point of the grip 20 coincides appreciably with the position of the edge 56. The grip 20 is then disunited from the connection terminal 36 and can be removed easily when inspection of the circuit breaker condition is carried out.

It can be noted that a standard frame 10 can be used, which can be individualized when the assembly operation has been completed by a judicious choice of the draw-in grips 20 and connection terminals 36, in terms of the rotating of the circuit breaker 14, the type of connection and the electrodynamic withstand (see FIG. 1).

The latching edge 56 may of course be disposed at the end of the lower face 60 of the connection terminal 36, the upper face 57 being in this case smooth.

What we claim is:

1. A fixed support frame for a withdrawable multipole circuit-breaker, capable of movement in translation between a first draw-in position and a second extraction position, said frame being shaped as a parallelepipedic housing and defining a front panel and a rear wall, said fixed support frame comprising:
    an opening in the front panel enabling the circuit-breaker to be extracted,
    an insulating support member arranged on the rear wall opposite the circuit-breaker opening in the front panel;
    fixed connection terminals of rectangular shape passing through said insulating support member, each connection terminal including a first connecting part external to the housing for electrical connection to an external busbar, and an opposite second connecting part internal to the housing;
    a plurality of draw-in grips mounted upon the second connecting parts of corresponding connection terminals, each draw-in grip including a plurality of pairs of opposing elementary contact fingers operating in conjunction with spring members;
    each contact finger of said draw-in grips comprising a bridge made of conducting material and equipped with two opposed first and second end contacts, said first end contact cooperating with the corresponding second connecting part of the fixed connection terminals, and said second end contact cooperating in the draw-in position with a contact terminal of a pole of the withdrawable circuit-breaker;
    a single latching edge arranged at an internal end of the second internal connecting part of each fixed connection terminal; and
    a conjugated notch located upon each draw-in grip and cooperating with said latching edge onto which it clips upon mounting said grip on the fixed connection terminal, so as to form a unilateral gripping, a tilting movement of said grip causing said edge to be automatically unclipped from the notch upon disassembly of said grip.

2. The fixed support frame according to claim 1, wherein the single latching edge extends transversely along a large face at the end of the rectangular connection terminal, a smooth opposite parallel face of said terminal being shaped as a sliding surface for the contact fingers of the grip, in such a way that the tilting point of the grip when disassembly takes place coincides with the position of the latching edge.

3. The fixed support frame according to claim 2, wherein a middle area of each fixed connection terminal includes holes enabling brackets to be mounted for fixing to the insulating support member of the rear wall.

4. The fixed support frame according to claim 1, wherein the notch is located in proximity to said first and second end contacts of each contact finger so that the grip presents a symmetrical structure in relation to the vertical mid-plane of the grip.

* * * * *